United States Patent [19]

Bolton et al.

[11] 4,149,974

[45] Apr. 17, 1979

[54] STRAINER APPARATUS MOUNTED WITHIN A TUBE

[75] Inventors: Theodore S. Bolton, Liverpool; Charles N. High, Cazenovia, both of N.Y.

[73] Assignee: Carrier Corporation, Syracuse, N.Y.

[21] Appl. No.: 875,061

[22] Filed: Feb. 6, 1978

Related U.S. Application Data

[63] Continuation of Ser. No. 783,535, Apr. 1, 1977, abandoned.

[51] Int. Cl.² ............................................. B01D 35/28
[52] U.S. Cl. ................................. 210/448; 210/441; 210/455; 403/371; 403/372
[58] Field of Search ............... 210/236, 238, 441, 443, 210/446, 448, 449, 455; 138/96 R, 96 T; 285/340, 342, 345; 55/507, 509, 378; 403/372, 371; D23/4

[56] References Cited

U.S. PATENT DOCUMENTS

| | | |
|---|---|---|
| 2,491,796 | 12/1949 | Baume .................................. 210/448 |
| 2,847,835 | 9/1958 | Cooper et al. ........................ 210/448 |
| 2,950,937 | 8/1960 | Bedford, Jr. .......................... 403/372 |
| 3,367,684 | 2/1968 | Anderson .............................. 285/340 |
| 3,429,596 | 2/1969 | Marshall ................................ 285/340 |
| 3,601,188 | 8/1971 | McGlamery ............................ 138/96 |
| 3,701,450 | 10/1972 | Belzberg ............................. 138/96 R |

*Primary Examiner*—Frank W. Lutter
*Assistant Examiner*—Gregory N. Clements
*Attorney, Agent, or Firm*—J. Raymond Curtin; Robert P. Hayter

[57] ABSTRACT

Strainer Apparatus for mounting within a tube, the apparatus comprising a strainer element having a cylindrical body portion and a conical end portion and a retainer having two concentric spaced cylindrical surfaces between which the strainer element is fastened, and a resilient collar containing a multiplicity of openings, said collar having an outside diameter greater than the internal diameter of the tube whereby upon insertion into the tube the collar is compressed forming a tight fit with the tube and holding the strainer apparatus stationary within the tube.

5 Claims, 5 Drawing Figures

STRAINER APPARATUS MOUNTED WITHIN A TUBE

This is a continuation, of application Ser. No. 783,535 filed Apr. 1, 1977, now abandoned.

BACKGROUND OF THE INVENTION

1. Field of Invention

This invention relates to strainers mounted within a tube and more specifically to strainers held within a tube by a press fit retainer.

2. Description of the Prior Art

Strainer apparatus for insertion into a tube has long been used to filter out unwanted particles in the medium carried by the tube. The medium flows through a conventional mesh strainer element which retains the unwanted particles while allowing the medium to pass therethrough.

The strainer apparatus has been held stationary within the tube by the engagement of a stressed collar with the interior surface of the tube. This collar would be shaped as a truncated cone having an outside diameter greater than the inside diameter of the tube. The collar was constructed of a resilient material whereby the collar would be compressed for insertion into the tube. Once in the tube the collar would expand against the interior surfaces of the tube with sufficient force to hold the collar in place and to form a tight seal within the tube. The strainer element would be affixed to the collar in such a manner that the medium flowing through the tube would pass through the center of the collar and through the strainer element.

This type of strainer apparatus although efficient, economical and easy to assemble has proved unacceptable for tubes having a small inside diameter. With a small inside diameter the collar tends to crimp and fold over upon itself during compression upon insertion. Furthermore, once the collar crimps or folds over, it is no longer capable of making a tight seal with the interior surface of the tube. Without a tight seal, there may be insufficient force exerted by the collar to hold the strainer apparatus stationary. Also, as a result of the crimping of the collar, unwanted particles may avoid being captured in the strainer element by passing through spaces between the interior tube surface and the collar.

SUMMARY OF THE INVENTION

An object of the present invention is to provide suitable within the tube strainer apparatus.

A further object of the present invention is to have within the tube strainer apparatus capable of affixing itself to the interior surface of the tube as well as forming a tight seal therewith.

Another object of the present invention is to have a within the tube strainer for use in small inside diameter tubes.

A still further object of the present invention is to construct an economical, reliable and easy to install within the tube strainer apparatus.

The above objects are accomplished according to a preferred embodiment of the invention by the provision of a straining element mounted to a retainer. The straining element is affixed between two concentric spaced surfaces of the retainer. The retainer holds the strainer apparatus stationary within the tube by the engagement of the collar with the interior surface of the tube. The collar is in the shape of a truncated cone and has an outside diameter greater than the inside diameter of the tube. The collar further defines a plurality of openings extending from the end of the collar having the largest diameter towards the end of the collar having the smallest diameter. The collar having a larger outside diameter than the inside diameter of the tube is compressed upon insertion into the tube to form a tight fit with the interior tube surfaces. The openings within the collar prevent crimping or folding of the collar thereby allowing for a tight seal with the interior tube surfaces.

DESCRIPTION OF THE PREFERRED EMBODIMENT

The embodiment of the invention below is adapted for use in a room air conditioner for removing unwanted particles from a line having refrigerant passing therethrough. It is to be understood that the described strainer apparatus would have like applicability in other tubes, pipes or lines in the air conditioning field as well as other arts requiring inside the tube strainer apparatus.

Figure 1:
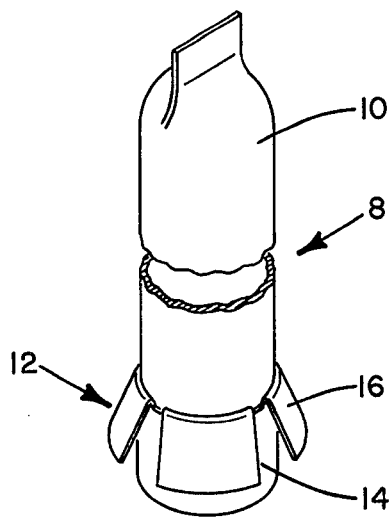
FIG. 1 is an isometric view of the invention.
Figure 2:
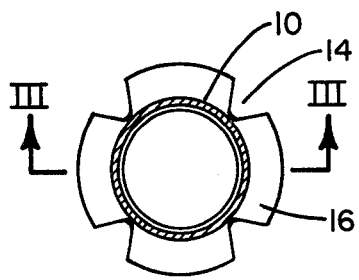
FIG. 2 is an orthographic top view of the invention having triangular shaped openings.
Figure 4:
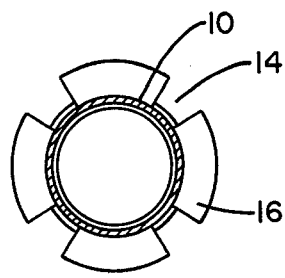
FIG. 4 is an orthographic top view of the invention having rectangular shaped openings.
Figure 3:
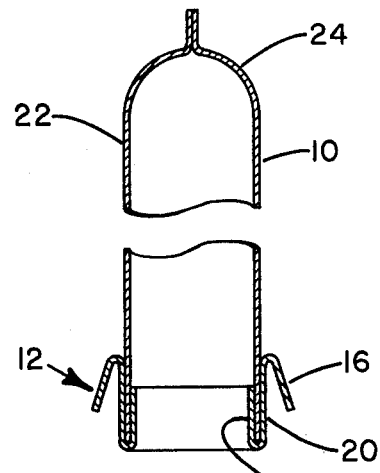
FIG. 3 is a sectional view of FIG. 2 at III—III with the collar in the unstressed position.
Figure 5:
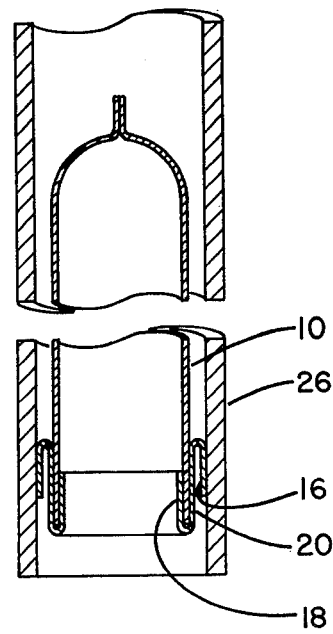
FIG. 5 is a sectional view of FIG. 2 at III—III with the collar shown in the compressed position inside the tube.

Referring now to the drawings, FIG. 1 is an isometric view of the invention showing strainer element 10 mounted to retainer 12. Collar 16 generally shaped in the form of a truncated cone is a part of retainer 12 and defines openings 14. FIG. 2 is an orthographic top view of FIG. 1 showing openings 14 as four spaced triangular shaped openings each having its base on the end of collar 16 at its largest diameter and tapering to a point towards the end of collar 16 having the smallest diameter. FIG. 4 is an orthographic drawing of another embodiment of the invention having rectangular openings in lieu of the triangular openings. FIG. 3 is a sectional view of FIG. 2 at III—III. Retainer 12 as shown is FIG. 3 comprises three parts connected to each other; collar 16, first cylindrical member 18 and second cylindrical member 20. The strainer element 10 comprises a cylindrical body portion 22 and a conical end portion 24. The straining element is attached to retainer 12 by inserting part of the cylindrical body portion between first cylindrical member 18 and second cylindrical member 20 of the retainer and mechanically compressing the two cylindrical members against the straining element. FIG. 5 is the same as FIG. 3 except that the strainer apparatus is shown inside tube 26 with collar 16 compressed to form a tight seal with the interior surface of the tube.

The strainer apparatus is inserted into the tube so that refrigerant flows into the straining apparatus through the straining element and out through the retainer. Of course the strainer apparatus will also be effective with flow in through the retainer and out through the straining element. Collar 16 is sized with its end of greatest diameter having a diameter exceeding the diameter of the tube to be inserted and its end of least diameter fitting within the tube. The collar is made from a resilient material, such as copper or brass.

Upon insertion into the tube collar 16 is compressed against the interior surface of the tube. Furthermore, during compression the openings in the collar are reduced in size allowing a reduction in collar diameter without the collar crimping or folding over on itself. This compression of the collar act to form a tight seal between the collar and the interior tube surfaces leaving flow through the straining element as the only available path for the refrigerant to pass the strainer apparatus within the tube. The collar as a result of its resilient characteristics exerts sufficient force against the interior tube surfaces to hold the collar and straining apparatus affixed to the tube.

Pursuant to the above description of the preferred embodiment, straining apparatus has been provided which is capable of insertion within a small inside diameter tube without crimping or folding, which forms a tight seal with the interior tube surfaces and which holds itself stationary within the tube.

The invention has been described in detail with particular reference to a preferred embodiment thereof, but it will be understood that variations and modifications can be affected within the spirit and scope of the invention.

We claim:

1. Strainer apparatus for insertion into a tube of an air conditioner having a medium flowing therethrough which comprises:
   a strainer element located within the tube for removal of unwanted particles from the medium flowing through the tube; and
   a unitary tubular member of resilient material, said tubular member having a first cylindrical portion (18) and a second cylindrical portion (20) coaxial with the first cylindrical portion, and said second cylindrical portion having an internal diameter greater than the external diameter of the first cylindrical portion, said first and second cylindrical portions being joined at their common ends to form an annular space therebetween such that the generally cylindrical end of the strainer element is secured between the first cylindrical portion (18) and the second cylindrical portion (20), and a frustoconical collar portion (16) integrally connected with the second cylindrical portion at the end of the second cylindrical portion distal from the end of the second cylindrical portion joined to the first cylindrical portion, said frustoconical portion being coaxial with the first and second cylindrical portions and being of greater inside diameter than the outside diameter of the second cylindrical portion and including a plurality of resiliently flexible segments extending outwardly such that openings are defined therebetween, whereby upon insertion of the strainer element and tubular member into the tube the flexible segments of the collar portion are compressed reducing the size of the openings and as a result thereof the segments engage the interior tube surfaces forming a tight seal therewith and simultaneously holding the tubular member and attached strainer element securely within the tube.

2. The apparatus as setforth in claim 1 wherein the openings are generally triangular in shape with the base of the opening being at the end of the collar having the greatest diameter and tapering therefrom toward the end of the member having the smallest diameter.

3. The apparatus as setforth in claim 2 wherein the outside diameter of one end of the collar exceeds the inside diameter of the tube.

4. The apparatus as set forth in claim 1 wherein the strainer element comprises a cylindrical body portion for insertion between the cylindrical members and a closed conical end portion attached thereto.

5. The apparatus as set forth in claim 1 wherein the openings are generally rectangular in shape extending from the end of the collar having the greatest diameter toward the end of the collar having the least diameter.

* * * * *